US011000058B2

(12) United States Patent
Diaz et al.

(10) Patent No.: US 11,000,058 B2
(45) Date of Patent: May 11, 2021

(54) METHOD FOR THE PRODUCTION OF AN EDIBLE OBJECT BY POWDER BED (3D) PRINTING AND FOOD PRODUCTS OBTAINABLE THEREWITH

(71) Applicant: Nederlandse Organisatie voor toegepast-natuurwetenschappelijk onderzoek TNO, s-Gravenhage (NL)

(72) Inventors: Jerome Villarama Diaz, 's-Gravenhage (NL); Martijn Willem-Jan Noort, 's-Gravenhage (NL); Kjeld Jacobus Cornelis van Bommel, 's-Gravenhage (NL)

(73) Assignee: STICHTING WAGENINGEN RESEARCH, Wageningen (NL)

( * ) Notice: Subject to any disclaimer, the term of this patent is extended or adjusted under 35 U.S.C. 154(b) by 298 days.

(21) Appl. No.: 15/116,048

(22) PCT Filed: Feb. 2, 2015

(86) PCT No.: PCT/NL2015/050063
§ 371 (c)(1),
(2) Date: Aug. 2, 2016

(87) PCT Pub. No.: WO2015/115897
PCT Pub. Date: Aug. 6, 2015

(65) Prior Publication Data
US 2017/0164650 A1 Jun. 15, 2017

(30) Foreign Application Priority Data
Feb. 3, 2014 (EP) .................................... 14153717

(51) Int. Cl.
*A23P 30/00* (2016.01)
*B33Y 80/00* (2015.01)
*B33Y 10/00* (2015.01)
*A23G 3/34* (2006.01)
*A21D 2/18* (2006.01)
*A21D 2/26* (2006.01)
*A23L 7/109* (2016.01)
*A23L 7/126* (2016.01)
*A21D 13/40* (2017.01)
*A23J 3/00* (2006.01)
*A21D 13/47* (2017.01)
*A21D 13/11* (2017.01)
*B29C 64/165* (2017.01)
*A23P 20/25* (2016.01)

(52) U.S. Cl.
CPC .............. *A23P 30/00* (2016.08); *A21D 2/183* (2013.01); *A21D 2/262* (2013.01); *A21D 13/11* (2017.01); *A21D 13/40* (2017.01); *A21D 13/47* (2017.01); *A23G 3/34* (2013.01); *A23J 3/00* (2013.01); *A23L 7/109* (2016.08); *A23L 7/126* (2016.08); *B29C 64/165* (2017.08); *B33Y 10/00* (2014.12); *B33Y 80/00* (2014.12); *A23P 2020/253* (2016.08); *A23V 2002/00* (2013.01)

(58) Field of Classification Search
CPC .......... A23L 7/107; A23L 7/126; A23P 30/00; B33Y 10/00; B33Y 80/00; A21D 13/40; A21D 2/183; A23G 3/34; A23V 2002/00
USPC ........................................................ 426/303
See application file for complete search history.

(56) References Cited

U.S. PATENT DOCUMENTS

| 2005/0191389 | A1* | 9/2005 | Jones ...................... A23L 27/74 426/250 |
| 2008/0260918 | A1 | 10/2008 | Lai et al. |
| 2009/0004275 | A1* | 1/2009 | Martyn .................. A61K 9/006 514/1.1 |
| 2009/0011115 | A1* | 1/2009 | Foss .......................... A23L 2/56 426/649 |
| 2013/0034633 | A1 | 2/2013 | von Hasseln |

FOREIGN PATENT DOCUMENTS

| CN | 103125544 A * | 6/2013 |
| WO | 2014193226 | 12/2014 |

OTHER PUBLICATIONS http://nutritiondata.self.com/facts/cereal-grains-and-pasta/9256/2?print=true, wheat flour 4 pages Jun. 14, 2018.*
http://nutritiondata.self.com/facts/cereal-grains-and-pasta/5726/0?print=true, rice flour 4 pages Jun. 14, 2018.*
http://nutritiondata.self.com/facts/cereal-grains-and-pasta/5726/0?print=true, chocolate 4 pages Jun. 14, 201.*
http://nutritiondata.self.com/facts/cereal-grains-and-pasta/5726/0?print=true, chocolate no sugar 4 pages Jun. 14, 201.*
http://nutritiondata.self.com/facts/cereal-grains-and-pasta/9255/2; Wheat flour, white nutrition facts obtained Sep. 13, 2010; Date verification: www.archive.org (Year: 2010).*

(Continued)

*Primary Examiner* — Jyoti Chawla
(74) *Attorney, Agent, or Firm* — Tarolli, Sundheim, Covell & Tummino LLP

(57) ABSTRACT

The present invention relates to a method for the production of an edible object, comprising providing an edible powder composition and at least one edible liquid, wherein the edible powder composition comprises a water soluble protein, a hydrocolloid and a plasticizer, and subjecting said composition to powder bed printing by depositing the edible liquid by spraying it onto the powder and thereby obtaining the edible object. Also food products obtainable with the method of the invention, particularly, a pasta, a cake object and a protein bar are disclosed.

12 Claims, 5 Drawing Sheets

(56) References Cited

OTHER PUBLICATIONS https://nutritiondata.self.com/facts/cereal-grains-and-pasta/5726/2; Rice flour nutrition facts, obtained Jul. 23, 2010; Date verification: www.archive.org (Year: 2010).* https://nutritiondata.self.com/facts/sweets/5472/2; Cocoa powder nutrition facts, obtained Sep. 5, 2010; Date verification: www.archive.org (Year: 2010).* http://nutritiondata.self.com/facts/dairy-and-egg-products/124/2; Egg white powder nutrition facts, obtained Dec. 31, 2010; Date verification: www.archive.org (Year: 2010).* http://nutritiondata.self.com/facts/dairy-and-egg-products/121/2; Egg whole dried nutrition facts, obtained Apr. 26, 2011; Date verification: www.archive.org (Year: 2011).*

Anonymous: "Interview: Kjeld van Bommel—3Digital Cooks," Nov. 12, 2013 XP055114256 URL: http://3digitalcooks.com/2013/11/interview-kjeld-van-bommel-tno/ [retrieved on Apr. 15, 2014] p. 3.

Anonymous: "Print Pasta Fazul Right on Your Plate—30 Printing Industry," Jan. 9, 2014 XP055114210 Retrieved from the Internet: URL:http://3dprintingindustry.com/2014/01/09/print-pasta-fazul-right-plate/[retrieved on Apr. 15, 2014] p. 1.

TNO Research: "30 Printing: now printing food too," Nov. 12, 2012 XP054975377 Retrieved from the Internet: URL:http://www.youtube.com/watch?v=x6WzyUgbT5A [retrieved on Apr. 15, 2014] the whole document.

\* cited by examiner

METHOD FOR THE PRODUCTION OF AN EDIBLE OBJECT BY POWDER BED (3D) PRINTING AND FOOD PRODUCTS OBTAINABLE THEREWITH

TECHNICAL FIELD

The invention relates to the field of additive manufacturing (AM, also known as rapid manufacturing, or 3D printing) of edible objects. Particularly, the present invention provides a method for the production of edible objects using the powder bed printing (PBP) technique.

BACKGROUND

The ability to print food with additive manufacturing is believed to potentially have a tremendous impact as it would provide complete food design freedom and thus rapid product innovation; would allow a highly efficient use of materials; and can eventually contribute to an increased consumer acceptance of alternative food materials (e.g. proteins from algae, among others) by turning them into well-structured and tasty food products.

Additive Manufacturing is the collective term for a number of individual technologies that allow the construction of 3D geometries directly from a 3D computer drawing in a layer-wise manner. AM processes take a 3D model, compute cross-sections of that model, and then deposit the cross-sections sequentially on top of each other until the final geometry is achieved.

There are many AM technologies, each of which based on different physical principles and generally using different materials. However, within the wide range of AM technologies a limited number of main technologies can be identified from which most of the other technologies are derived.

Powder bed 3D printing is a technique where droplets of a pumpable liquid are deposited onto a layer of a powder. This liquid can then promote the binding/consolidation the powder into a solid object. By carrying out this process in a stepwise layer-by-layer manner, a 3D fused object can be produced.

Powder bed printing has predominantly been used for the manufacture of 3D shapes for industrial manufacturing such as for the production of metal or ceramic 3D shapes that will otherwise not be possible via traditional moulding processes. For example, powder bed printing has been used for making everyday objects from plastics by jetting a liquid binder. Recently, 3D food printing using sugar has been demonstrated by The Sugar Lab and 3D Systems company.

The major challenge in printing food via powder bed printing is the creation of varying food structures that will result in the perception of various textures. The interactions between food ingredients define what is called the food micro-structure. While it is known that powdered sugar may be printed using powder bed printing technology, food comprising more elaborate micro-structures has not been discovered yet.

It is therefore desirable to have the ability to print food structures with different textures. It is also desirable to print food structures containing ingredients of different chemical origin.

BRIEF DESCRIPTION OF THE DRAWINGS

The foregoing and other features of the present disclosure will become apparent to those skilled in the art to which the present disclosure relates upon reading the following description with reference to the accompanying drawings, in which.

SUMMARY

Figure 1:
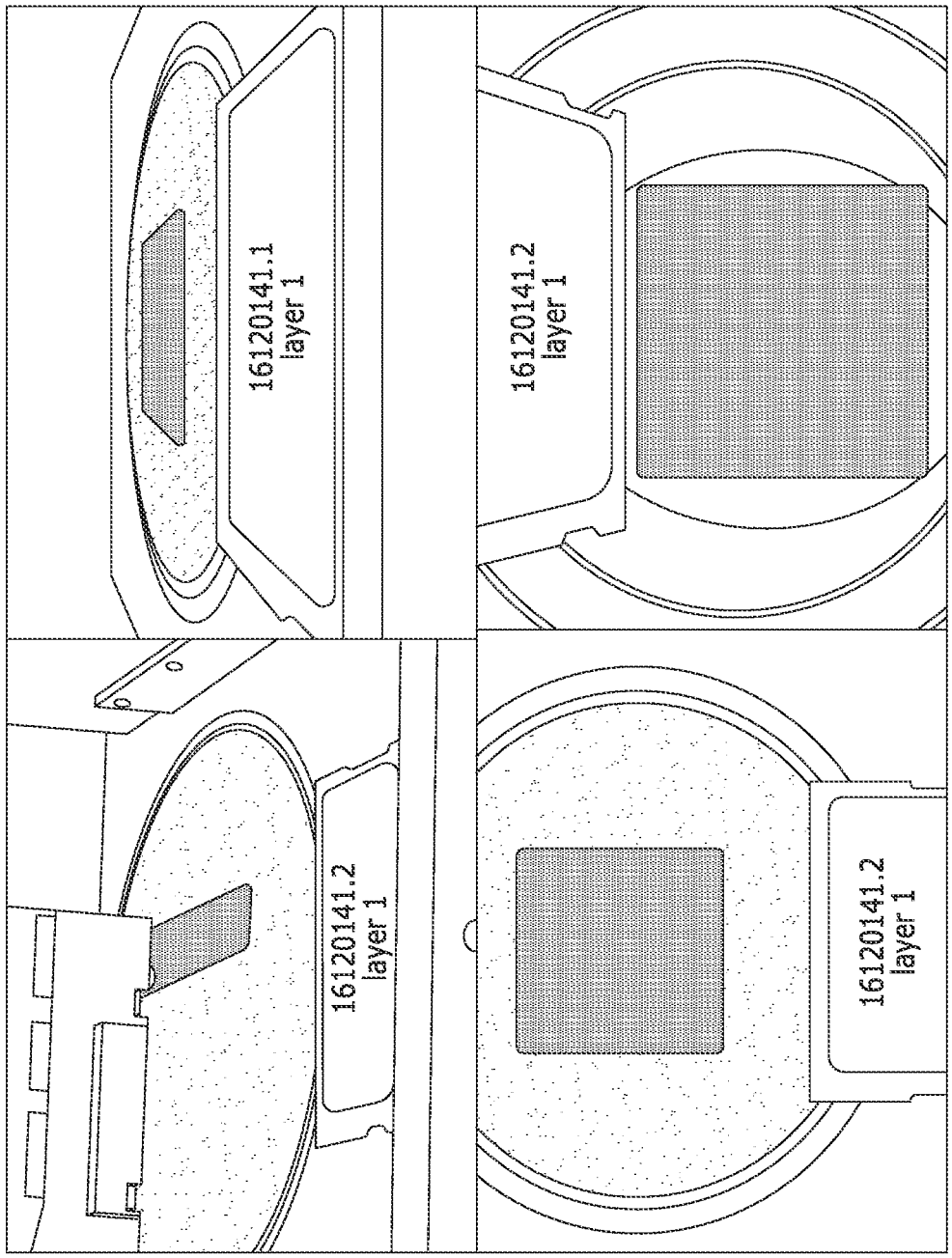
FIG. 1 is a schematic illustration showing printing of pasta from a powder bed formulation according to one aspect of the present disclosure. Top left: water is being sprayed on the powder bed; top right and bottom left: powder bed is being consolidated into a pasta immediately; bottom right: consolidated pasta object can be taken out of the powder bed immediately.

In order to address one of more of the foregoing desires, the present invention provides, in one aspect, a method for the production of an edible object, comprising providing an edible powder composition and at least one edible liquid, wherein the edible powder composition comprises a water soluble protein, a hydrocolloid and a plasticizer, and subjecting said composition to powder bed printing by depositing the edible liquid onto the powder in layer-wise manner and thereby obtaining the edible object.

In another aspect, the invention provides a food product comprising the edible object obtainable by the method of the invention.

DETAILED DESCRIPTION

In the method of the invention edible liquid droplets are jetted into any desired spatial arrangement onto a powder bed using an powder bed printer in a layer-wise manner resulting in a 3D food object with desired, tune-able microstructures.

It has now been found that formulating powdered food components comprising a water soluble protein component and/or a component with a water holding/binding capacity and, in addition, the precision spatial jetting of various fluid food ingredients using powder bed (3D) printing technology leads to the production of freeform, edible 3D objects with a variety of microstructures. This invention makes it possible to print not just complex 3D shapes but more importantly, food products with complex, tunable 3D edible microstructures. The end result is that complex foods with different microstructures may be produced. Some examples of these include pasta, cakes, and cookies, among others. It is also possible to print meat-analogues using the findings of this invention.

Accordingly, the formulation suitable for PBP and used in the present invention is an edible powder composition comprising a water soluble protein and/or a hydrocolloid.

Therefore, the invention provides a multi-material mixture for obtaining an edible object by PBP. While it is possible to produce 3D structures using either the water soluble protein or the hydrocolloid, better results are obtained when both the water soluble protein and the hydrocolloid are present. In that latter case, however, it is not required that both components should be present in the powder composition. It is possible that the water soluble protein or the hydrocolloid is present in the edible liquid, for example in the form of an aqueous solution or emulsion/dispersion.

The edible powder composition is preferably a free-flowing powder. The term "free-flowing powder", as used herein, is well known to those skilled in the art and includes particulate materials that can be poured (e.g., from one vessel having an opening of from about 10 cm$^2$ to 50 cm$^2$ to another vessel of similar dimensions) without substantial clumping of the particles. In detail, the term "free-flowing" is used for a powdered material that is not sticky, and thus has no or hardly any tendency to agglomerate or to adhere to contact surfaces. The so-called angle of repose, θr, is sometimes used as a measure for the flow properties of powders. The angle of repose is the angle that a cone of powder forms between a flat surface when it is poured onto that surface. Typically, for a free-flowing powder θr is low, e.g. smaller than 30°.

One of the components of the edible powder composition is a water soluble protein, which acts as a structure forming agent and provides for consolidation of the filler (if present) or other components. Suitable proteins are edible proteins, usually of animal or plant origin. Preferred proteins of animal origin are dairy proteins such as casein, whey proteins, albumin, or others such as gelatin, ovalbumin. Mixtures of proteins can also be used. In some embodiments, it is preferred to use whey protein. In other embodiments, the preferred protein may be casein. In some embodiments, the protein is used without the hydrocolloid, for example when the protein itself has moisture binding capabilities, e.g. gelatin, milk or egg proteins. The content of the water soluble protein in the edible powder compositions is preferably in the range 3-95 wt. %. Depending on the product and desired texture, the amount of the water soluble protein can be varied broadly. For some products the protein can be present in an amount 60-90 wt. %, while for other products lower amounts such as 5-30 wt. % can be desirable.

Another component of the edible powder composition can be a hydrocolloid. Hydrocolloids are hydrophilic polymers of vegetable, animal, microbial or synthetic origin, that form colloidal dispersions in water. In the described edible composition the hydrocolloid acts as a binder component and helps to ensure the control of the migration and flow of the liquid spray into the powder bed during printing. Hydrocolloids have a water binding capacity and help to retain moisture in the food structure. Typically, they are also able to form gels. In order to provide sufficient water binding capacity, the content of hydrocolloid present in the composition is preferably at least 0.1 wt. %, more preferably in the range 0.1-20 wt. %, based on the total dry weight of the composition.

In some embodiments, the hydrocolloid is a polysaccharide hydrocolloid (including polysaccharide derivatives), preferably a natural gum. Examples of natural gums that are useful in the present invention include vegetable gums such as guar gum, locust bean gum, gum arabic and konjac gum; gums derived from seaweed such as carrageenan gum (e.g. K-carrageenan gum), alginates, agar; gums derived from bacteria such as gellan gum, pullulan and xanthan gum. Another group of preferred polysaccharide hydrocolloids is the group including cellulose and cellulose-derivatives such as carboxymethylcellulose, methylcellulose, and also hemicellulose such as mannans, galactomannans, xyloglucans, glucomannans, arabinoxylans, β-glucan, arabinogalactan. Other groups of preferred polysaccharide hydrocolloids are pectins, fructans, chitin. In other embodiments, the hydrocolloid is a protein, preferably gelatin. Also mixtures of different hydrocolloids can be used. In some embodiments, the hydrocolloid is used without an additional water soluble protein. In a preferred embodiment, however, both the water soluble protein and the hydrocolloid are present.

In some embodiments, the formulation for PBP further comprises a structural component (filler). Filler ingredients are powder bed components that serve as a bulking agent in the food structure that is going to be printed. The filler is usually the component present in the powder bed formulation in the highest quantity. In addition, the filler material defines the basis of the structure to be printed, being carbohydrate-based, protein-based, or lipid-based. However, combinations of filler materials are also possible.

The filler is a food grade, preferably free-flowing, powder material that can be carbohydrate-based, protein-based or lipid-based. Also combinations of these different materials can be used as a filler.

Carbohydrate-based filler ingredients can for example be selected from flour, semolina, starch, maltodextrin, cyclodextrins, sucrose, dextrose, derivatives thereof and mixtures thereof. Protein-based filler ingredients can for example be dairy derived proteins such as whey and casein, plant derived proteins such as soy, pea, grass, wheat, leaves, algae protein; or animal derived protein such as egg protein, gelatin, dried muscle protein and their individual components, or insect protein. Mixtures of proteins can also be used. Lipid-based fillers preferably contain vegetable derived lipids, animal derived lipids or mixtures thereof. Examples of lipid-based filler ingredients are palm fat powder, cocoa powder and milk fat powder. Mixtures of fats and/or (powdered) oils can also be used.

In a particularly preferred embodiment, the edible powder composition comprises a plasticizer. The role of the plasticizer is believed by inventors to lower the glass transition temperature ($T_g$) of the powder used. Plasticizer itself has a low $T_g$, and preferably, it is the component with the lowest $T_g$ in the powder composition. For example, in case a filler is present, the plasticizer has a $T_g$ lower than that of the filler. Also a mixture of compounds can be used as a plasticizer. Plasticizer is preferably present in the powder composition in an amount of 1-90 wt. %, more preferably 10-80 wt. %. Depending on the product and desired texture, the amount of plasticizer can be varied broadly. For some products the plasticizer can be present in an amount 1-30 wt. %, while for other products higher amounts up to 60 wt. %, or 70 wt. % can be desirable.

Although the principle of PBP is not based on melting under increased temperature such as for example in selective laser sintering (SLS), without wishing to be bound by particular theory, inventors believe that $T_g$ of the components is also important for PBP. The inventors further believe that when contacted with an edible liquid, the powder tends to undergo a transition that is similar to glass transition. Due to a lower $T_g$, the plasticizer undergoes this transition earlier than other components. As a result of the working of the plasticizer the powder system can "flow" under PBP conditions. In this way, the plasticizer can contribute to the aggregation of the particles in the powder bed into a desired texture.

Preferably, plasticizer is a polysaccharide or a mixture thereof, e.g. polydextrose, starch hydrolysates, maltodextrins, galactomannans, bacterial polysaccharides. However, also sucrose, other small sugars (di- and tri-saccharides), protein hydrolysates and egg white protein can be used as a plasticizer. In some embodiments, it is preferred to use a polysaccharide, egg white protein, or a mixture thereof.

In one preferred embodiment, the plasticizer is a polysaccharide. A particularly preferred plasticizer is polydextrose, which has a $T_g$ in the range of about 20-25° C. As an example, polydextrose can be advantageously combined with whey protein as a water soluble protein, which has a $T_g$ of about 35° C. In another embodiment, the plasticizer is maltodextrin. In yet another preferred embodiment, a mixture of different plasticizers is used.

In some embodiments, the composition comprises hydrolyzed starch for competitive hydration. This can be used when highly soluble components are used (such as proteins) to prevent running of the mixture. Highly soluble components may immediately form a liquid solution when contacted with water or other edible liquids during PBP, even in limited amounts, which prevents forming of a consolidated structure.

The edible powder composition may further comprise conventional additives that may be used for structuring, such as (pyro)phosphates, organic acids, carbonates, etc. For example, baking soda can be used for gas forming during the printing process. Also flavouring agents and other conventional additives can be used. For example, in confectionary applications, sugar or other sweeteners can be added to create a sweet taste.

During powder bed printing the droplets of at least one edible liquid suitable for PBP are deposited on a layer of the edible powder composition. A liquid suitable for PBP means that the liquid is suitable to pass through a nozzle orifice and is pumpable. The edible liquid can comprise water and/or an edible lipid. A skilled person is able to find a suitable amount of the edible liquid to be used that is sufficient to create a three-dimensional structure. Typically, the amount of the liquid should be limited to prevent running but high enough to start aggregation. Generally, a printed product would comprise 10-80 wt. % of the liquid, preferably water. More preferably, the product comprises 20-70 wt. % of the liquid.

In one embodiment, the edible liquid comprises water. The edible liquid can for example be water as such, or an aqueous solution containing other ingredients such as carbohydrates. Preferred carbohydrates are inulin, glucose syrup, sugar alcohols and polysaccharides. Mixtures of different carbohydrates can also be used. The amounts to be used can vary from 10 to 70% by weight of the powder composition.

In another embodiment, the edible liquid comprises an edible lipid. The edible lipid may contain oils and/or fats. "Lipids" is used here to refer triglycerides of fatty acids both liquid and solid, whereas "oils" refer to lipids that are liquid at normal room temperature and "fats" refer to lipids that are solid at normal room temperature. The edible lipid can for example be selected from vegetable oils such as sunflower oil or animal derived fats.

In a further embodiment, the edible liquid comprises both water and lipids, for example in the form of an emulsion or suspension.

Also viscous liquids such as honey, glucose syrup and gels can be used as long as they can be sprayed with the equipment used. In addition, different types of edible liquids can be deposited on the same powder layer (or in different layers), e.g. when more than one nozzle is used for printing. For example, the edible liquids can be water, oil and an aqueous solution of a carbohydrate, sprayed using three separate nozzles.

Any suitable PBP printer can be used to obtain the edible object of the invention. While a printer with a single nozzle can be used, the variety of the microstructures obtained can be improved by using multiple nozzles. Also the droplet size, deposition precision, deposition pattern, frequency and spatial arrangement may be varied to provide different microstructures.

The advantage of the present invention is that it allows to print edible objects with different microstructures and textures. Herein-below some of the preferred embodiments are discussed in more detail.

In one preferred embodiment, the edible object to be printed is pasta. Pasta is typically an edible food with a microstructure wherein starch is entrapped in a network of protein. A formulation suitable to obtain pasta preferably comprises a carbohydrate-based filler which is insoluble in water. Preferred fillers comprise starch, flour, semolina, and their derivatives, or mixtures thereof. Typically, the filler is present in an amount of at least 50 wt. % of the powder composition, more preferably in the range 60-99 wt. %. The water soluble protein used is preferably albumin. Other proteins may also be used, for example whey protein, casein, gelatin, various soluble plant proteins. Preferred hydrocolloids are gums, particularly guar gum. Other hydrocolloids may include microbiologically obtained hydrocolloids such as xanthan gum, plant derived hydrocolloids such as gellan gum, animal derived hydrocolloids such as gelatin. The liquid to be used for printing is preferably water. The printed pasta may be cooked in boiling water directly after printing, or it can be dried to be consumed later.

In another preferred embodiment, the edible object to be printed is a cake, a cookie or another confectionary product. The filler component can be carbohydrate-based or lipid-based, or contain a combination thereof. The carbohydrate-based filler preferably comprises starch, or flour and/or their derivatives. The lipid-based filler preferably contains powdered preparations of vegetable lipids such as soybean, sunflower, cottonseed oil or cocoa butter. The water soluble protein preferably contains albumin, for example in the form of egg white. In addition, in some cases, e.g. cakes, the powder composition may comprise a bubble producing component. The latter component produces air bubbles during the printing—particularly during spraying with water—and in this manner air bubbles are being entrapped in the printed structure. Such bubble producing component can for example be a carbonate or bicarbonate, particularly sodium bicarbonate.

In a further preferred embodiment, the edible object to be printed is a gel or a gum. Example of edible gels are custard, jelly desserts, gummi candies such as gummy bears. In this case, the filler component is protein-based. The preferred hydrocolloids are gellan gum, iota carrageenan, agarose.

In yet another preferred embodiment, the edible object to be printed is a protein bar or a meat replacement product. Also in this case, the filler component is preferably protein-based, for example soybean protein.

In another preferred embodiment, the edible object printed is a protein bar. The formulation for printing preferably comprises 60-90 wt. % whey protein, 5-20 wt. % egg white protein, 1-10 wt. % polydextrose, 0.1-5 w. % xanthan gum. This formulation allows to print a protein bar with good consolidation and a desirable chewy/soft texture. In another variant of the above protein bar, the whey protein is partially (for 10-90 wt. %) replaced by maltodextrin and the formulation thus comprises 5-85 wt. % whey protein, 5-85 wt. %, 5-20 wt. % egg white protein, 1-10 wt. % polydextrose, and 0.1-5 wt. % xanthan gum. More preferably, the whey protein is replaced for 30-70 wt. % by maltodextrin. With this formulation a protein bar is obtained with a rubbery, soft texture which is retained overnight.

The method according to the invention allows to obtain complex food structures such as starch entrapped in a protein network (as present in pasta) or gelatinized starch with entrapped air and fat plasticizer (as present in cakes and cookies) which have hitherto not been achievable using 3D powder bed printing. The method allows to create different structures ranging from soft and moist to rigid and crunchy.

In another aspect, the invention provides a food product comprising the edible object obtainable by the method of the invention. Since the edible objects are formed without using mechanical shear forces, as usually done during conventional preparation of dough or other edible compositions, it is believed that, on the micro-level, the structure of the printed objects is different from the known, conventionally made, edible objects. Nevertheless, the tests have shown that the 3D objects such as pasta and cookies printed according to the invention and further cooked (baked or boiled) conventionally, reproduce the taste and mouthfeel of the conventional, non-printed objects subjected to the same cooking steps.

For the purpose of clarity and a concise description features are described herein as part of the same or separate embodiments, however, it will be appreciated that the scope of the invention may include embodiments having combinations of all or some of the features described. The invention will be now illustrated on basis of the following examples which do not limit the scope of the claims The parts and percentages are by weight unless indicated otherwise.

EXAMPLES

Example 1

3D Printing of Pasta

Formulation includes:
90 wt. % flour
5 wt. % protein powder (albumin)
5 wt. % guar gum
Liquid spray: water
Procedure:
A powder bed consisting of the abovementioned formulation is used in conjunction with a 3D printer platform (powder bed inkjet printer). The 3D printer then delivers liquid water via a nozzle head that is controlled by a computer. Upon delivery of the correct amount of water (10-70% dry basis), the powder bed formulation is consolidated into a solid pasta object that can be taken out of the powder bed immediately after printing. The freshly printed pasta may be cooked in boiling water immediately and then consumed. The printed pasta may also be dried to be consumed later.

The printing of pasta from a powder bed formulation is shown in FIG. 1. Top left: water is being sprayed on the powder bed; top right and bottom left: powder bed is consolidated into a pasta immediately; bottom right: consolidated pasta object can be taken out of the powder bed immediately.

Figure 2:
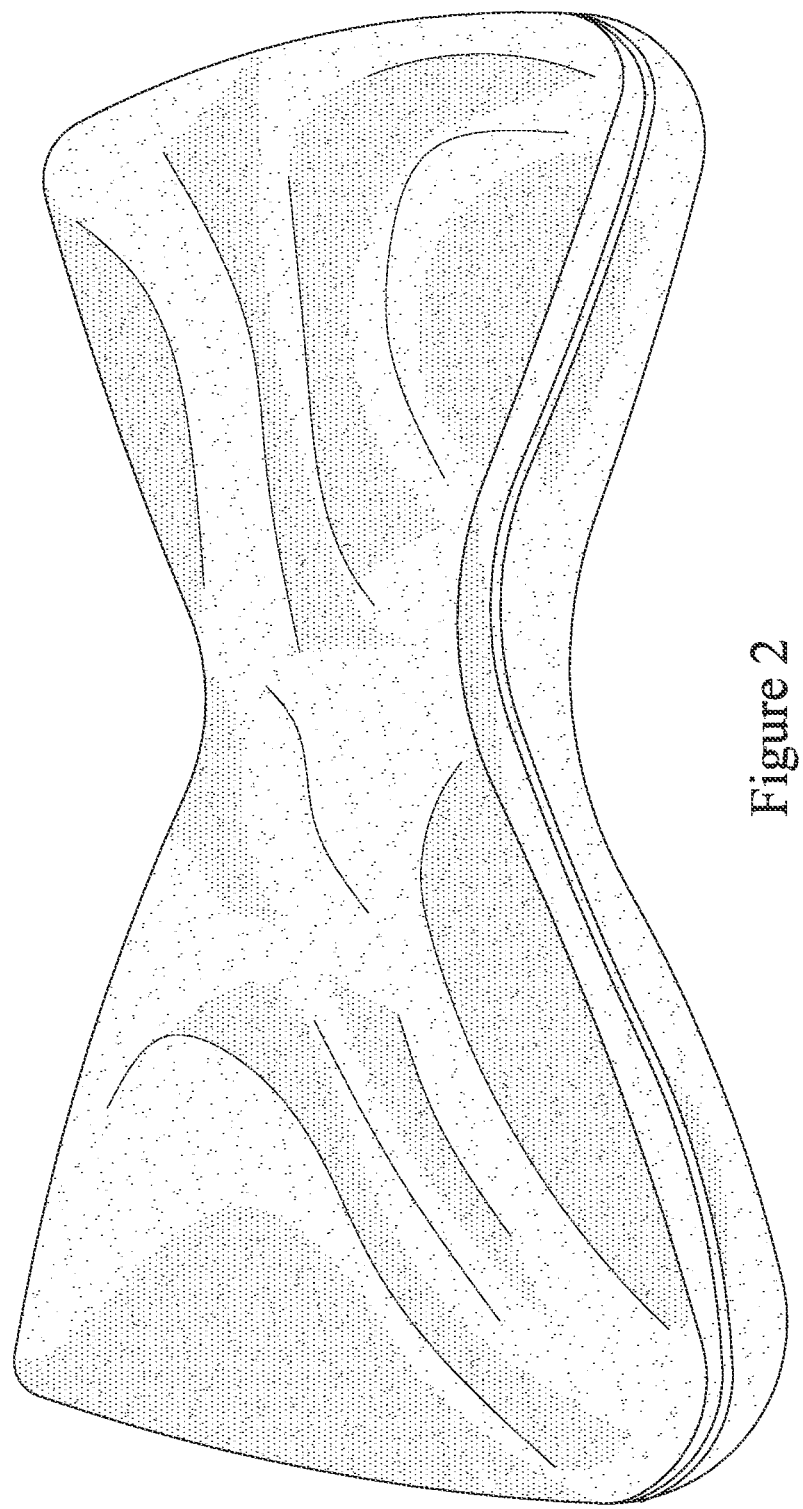
FIG. 2 is a schematic illustration showing an example of a three-dimensional (3D) pasta object printed in accordance with another aspect of the present disclosure.

FIG. 2 shows another example of a printed 3D pasta object.

Example 2

3D Printed Cake

Formulation:
25 wt. % flour
12 wt. % egg white powder
15 wt. % shortening powder
13 wt. % sugar
2 wt. % maltodextrin
0.4 wt. % sodium bicarbonate
0.6 wt. % pyrophosphate
Liquid spray: Water 30% of the dry weight of the powder
Procedure:
The abovementioned formulation is used as the basis of the powder bed mixture. The powder bed is used in conjunction with a 3D printer which may consist of a number of nozzles (multi-nozzle powder bed printer). The 3D printer delivers the water (30%) dry weight of the powder bed used. In multi-nozzle printer, the fat and sugar can be omitted from the powder bed formulation and used as liquid sprays in the multi-nozzle powder bed printer. After the 3D shape is printed, the cake object that is produced can be readily taken out of the powder bed and baked using a conventional heating oven. In using a multi-nozzle printer, the effect is the modulation of texture and/or mouth feel from chewy to crispy.

Figure 3:
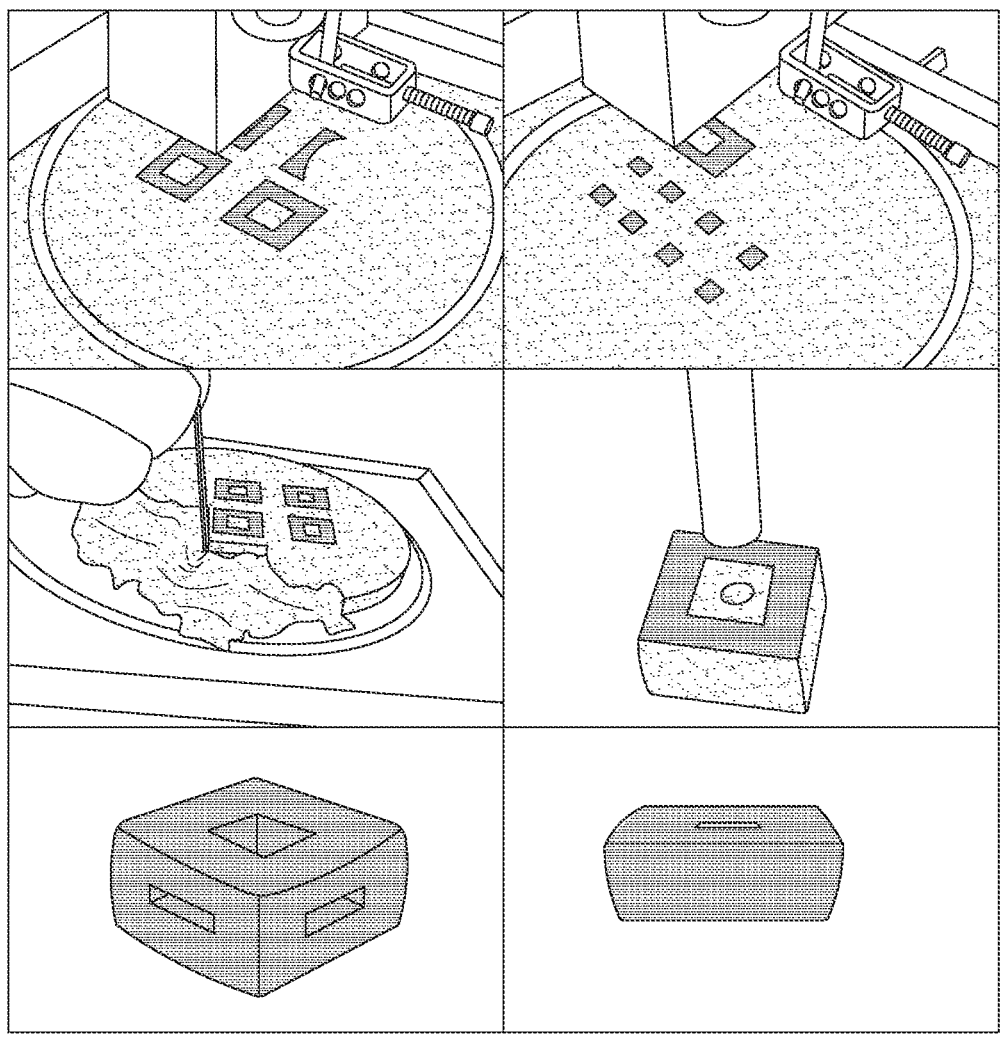
FIG. 3 is a schematic illustration showing cake producting using 3D power bed printing in accordance with one aspect of the present disclosure. The powder bed is consolidated layer-by-layer into desired 3D shape (top left and right). The cake structure that is produced can be taken out of the printer immediately after printing (middle left and right). The consolidated shape can be baked. Multi-textured 3D cake shapes can be obtained (bottom left and right).

FIG. 3 shows the cake production using 3D powder bed printing technology. Powder bed is consolidated layer by layer into desired 3D shape (top left and right). The cake structure that is produced can be taken out of the printer immediately after printing (middle left and right). The consolidated shape can be baked. Multi-textured 3D cake shapes can be obtained (bottom left and right).

Example 3

3D Printed Protein Bar
Formulation 1:
75% whey protein
15% egg white powder
7.5% polydextrose
2.5% xanthan gum
Formulation 2:
Same as formulation 1, but instead of whey protein a mixture of whey protein with maltodextrin is used, in weight ratios whey protein : maltodextrin of 90:10, 70:30, 30:70 and 10:90.

Liquid spray: water in an amount 50 wt. % (for both formulations)

Formulation 1 without egg white powder resulted in an acceptable texture, however the appearance of the printed product shows a pattern of colour variations due to uneven wetting. Egg white powder was used to achieve even wetting.

Figure 4:
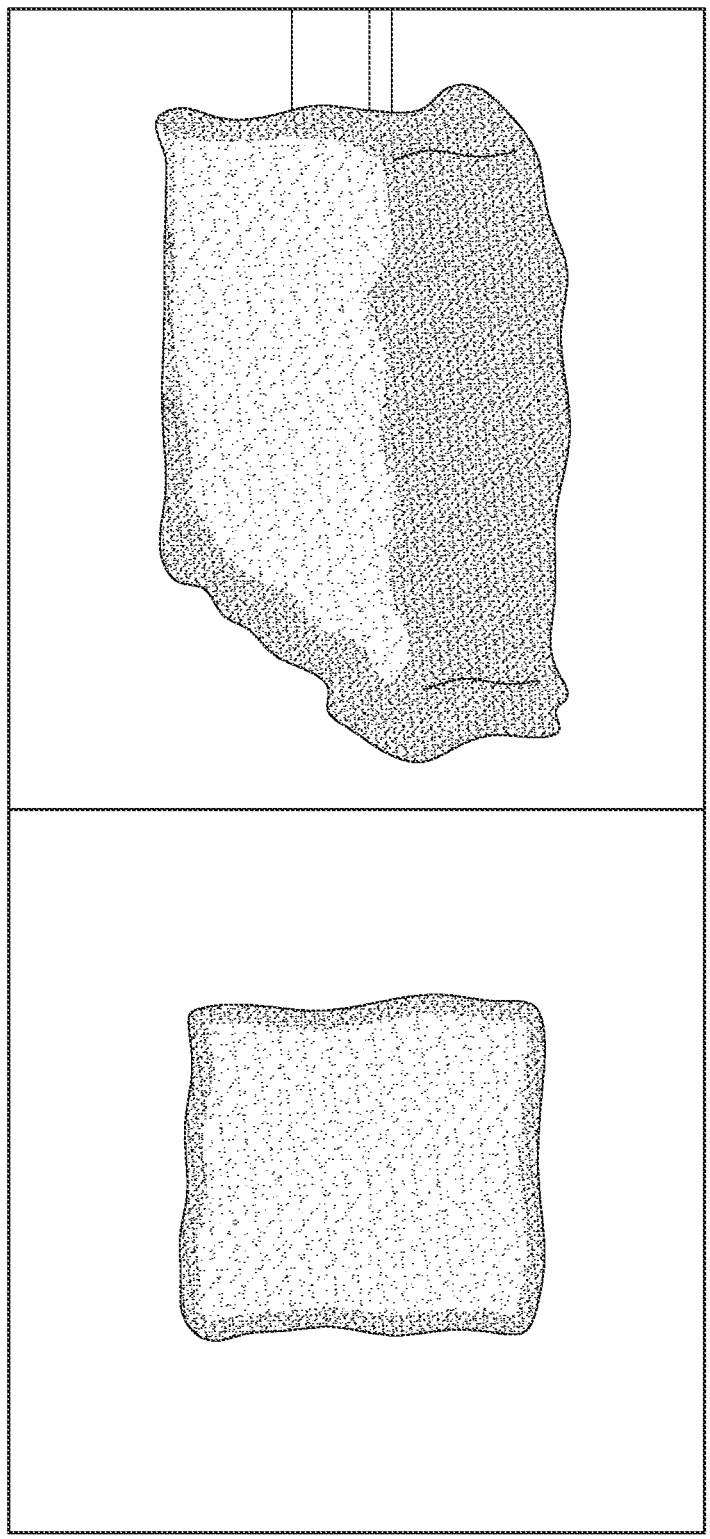
FIG. 4 is a schematic illustration shoing a 3D-printed protein bar produced according to one aspect of the present disclosure.

The protein bar printed with formulation 1 shows intact edges, good consolidation and fully hydrated shape when printed. The obtained texture when printed is chewy/soft and ready-to-eat type. FIG. 4 shows the printed product with formulation 1. The texture however hardens after storage overnight.

Figure 5:
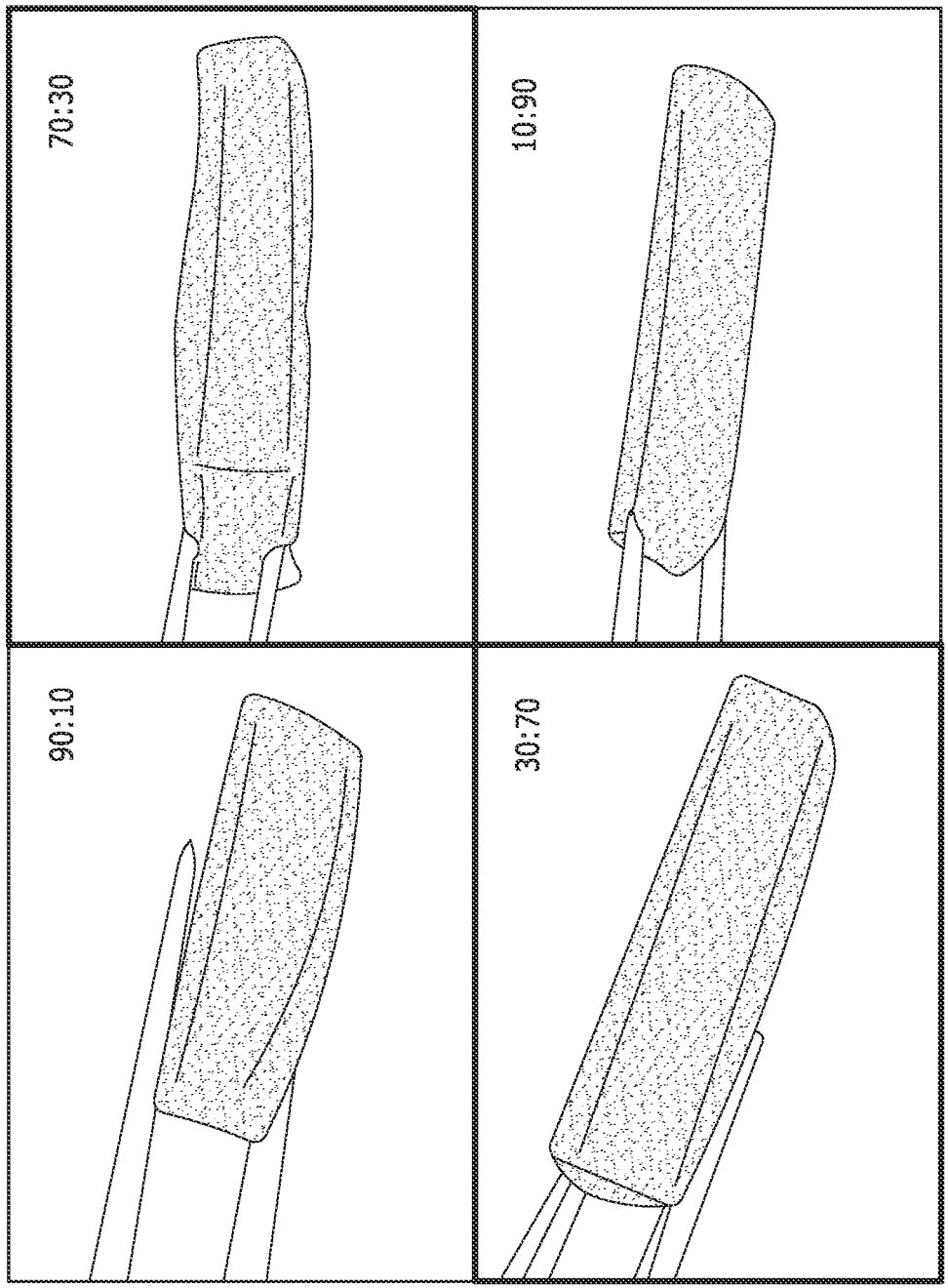
FIG. 5 is a schematic illustration showing a 3D-printed protein bar produced according to another aspect of the present disclosure.

Formulation 2 wherein part of whey protein was replaced with maltodextrin resulted in a protein bar with well defined edges and shape. The 10 and 90% samples produce dry, hard textures. The 30 and 70% samples produce rubbery, soft textures. FIG. 5 shows the printed product with formulation 2 with different protein:maltodextrin ratios. The textures of the products were retained overnight.

The invention claimed is:

1. A method for the production of an edible object, comprising providing an edible powder composition and at least one edible liquid, wherein the edible powder composition comprises a water soluble protein, a hydrocolloid and a plasticizer, and subjecting said composition to powder bed printing by depositing the edible liquid onto the powder in layer-wise manner and thereby obtaining the edible object;

wherein the content of the water soluble protein in the edible powder composition is 3-95 wt. % of the edible powder composition;

wherein the plasticizer is polydextrose or maltodextrin;

wherein the content of the plasticizer in the edible powder composition is 1-30 wt. %.

2. The method according to claim 1, wherein the edible powder composition comprises at least 0.1 wt. % of the hydrocolloid, based on the total dry weight of the composition.

3. The method according to claim 1, wherein the water soluble protein is selected from the list consisting of albumin, whey, casein, ovalbumin, gelatin and mixtures thereof.

4. The method according to claim 1, wherein the hydrocolloid is a polysaccharide selected from the list consisting of guar gum, locust bean gum, gum arabic, konjac gum, carrageenan gum, alginates, agar, gellan gum, pullulan, xanthan gum, cellulose, carboxymethylcellulose, methylcellulose, mannans, galactomannans, xyloglucans, glucomannans, arabinoxylans, β-glucan, arabinogalactan, pectins, fructans, chitin and mixtures thereof.

5. The method according to claim 1, wherein the edible powder composition further comprises a filler, wherein the filler comprises a lipid selected from the list consisting of vegetable derived lipids, animal derived lipids and mixtures thereof.

6. The method according to claim 1, wherein the edible powder composition further comprises a filler, wherein the filler is a carbohydrate selected from the list consisting of flour, semolina, starch, derivatives thereof and mixtures thereof, and wherein the hydrocolloid is a gum.

7. The method according to claim 1, wherein the edible powder composition comprises 60-90 wt. % whey protein, 5-20 wt. % egg white protein, 1-10 wt. % polydextrose, 0.1-5 wt. % xanthan gum.

8. The method according to claim 1, wherein the at least one edible liquid comprises water or oil, or water and oil.

9. The method according to claim 1, wherein the edible powder composition is a free-flowing powder.

10. A food product comprising the edible object obtainable by the method of claim 1.

11. The food product according to claim 10, being pasta, a confectionary product, a protein bar, a meat replacement product or a gel.

12. The method according to claim 1, wherein the edible object is formed without the use of mechanical sheer forces.

* * * * *